April 8, 1958
H. A. TOULMIN, JR
2,829,430
CUTTING COMPOUNDS
Filed Feb. 20, 1953
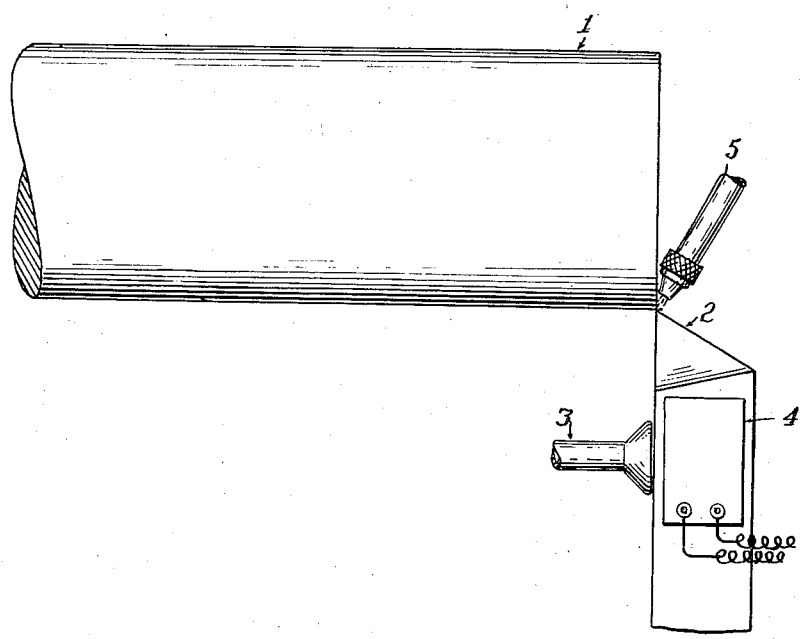
INVENTOR
Harry A. Toulmin Jr.
BY Toulmin & Toulmin
ATTORNEY United States Patent Office 2,829,430
Patented Apr. 8, 1958

2,829,430
CUTTING COMPOUNDS

Harry A. Toulmin, Jr., Dayton, Ohio, assignor to Midland Chemical Corporation, Wilmington, Del., a corporation of Delaware Application February 20, 1953, Serial No. 337,908

12 Claims. (Cl. 29—424)

This invention relates to new compositions of matter and particularly to compositions especially adapted for use as cutting compounds during processing or working operations such as cutting, drilling, grinding, tapping, milling, drawing, metal-stamping and the like.

Numerous problems arise in connection with cutting compounds used in machining such metals as mild and stainless steels, steel alloys and cast iron. One such problem which arises in many cutting operations, such as those performed on lathes and drill presses, is the difficulty of keeping the cutting compound at the cutting point in spite of the continual flow of metal past that point. Without proper, continuous liquid flow at the cutting point, for instance if the cutting compound has weak film strength, or if it tends to drain away from the cutting point, there is a tendency for metal to build up on the cutting tool, and this hampers cutting. There is also the problem of friction accompanying a given cutting or other metal-working job and which increases with increase in speed, with the result that at high cutting speeds the heat generated is so intense that, in the event of metal-to-metal contact, the metals will tend to weld together, with inevitable scoring or tearing out of metal and the acquisition of a rough surface by the object being processed, shorter life of the tool, and/or reduced cutting speeds.

The most troublesome problem arises from the fact that, invariably, the metal pieces which have been cut or otherwise processed or worked, are left around the shop for rather extended periods of time, often as long as two or three weeks, before being assembled, and during that time are exposed to corrosive influences, including rusting as the result of perspiration transferred to the object during handling thereof by the shop personnel. Even very brief periods of time are sufficient for rusting to occur.

Although intensive investigations have been carried on in the search for an ideal cutting compound, and many types of cutting compounds have been proposed in the prior art, looking to the elimination of the aforementioned and other problems which beset the metalworking industry, the available cutting aids are defective in one respect or another. Either they lack sufficient film strength and tend to drain away from the area of contact between the tool and the part being machined, or they do not prevent build-up of metal chips on the tool, or they do not exhibit the high heat absorption essential for a high-speed cutting operation, or they are not strongly resistant to oxidation or atmospheric attack, or they afford no protection for the machined parts when they are laid aside temporarily awaiting assembly, and if corrosion is to be avoided during such period, special treatment of the part, separate from the cutting operation, is required.

An object of this invention is to provide the use of a novel cutting compound having high film strength and which clings tenaciously to the cutting edge.

Another object is to provide the use of a novel cutting compound having increased heat-conductivity and which carries away heat developed in separating the chip from the work.

A further object is to facilitate sliding of the chip over the tool, thereby reducing the generation of frictional heat and inhibiting build-up of metal on the tool.

Another object is to provide the use of a novel cutting compound having exceptionally high heat-absorption capacity and use of which results automatically in effective temperature and friction control even at high cutting speeds.

Another object is to provide the use of a novel cutting compound which forms a protective coating on the machined part and functions to prevent or retard rusting of the metal when the part is exposed to oxidative influences including the corroding effects of human perspiration which may be deposited on the finished work during handling thereof.

Still another object is to increase the durability of the tool, such as a cutting tool.

These and other objects of the invention are accomplished by the provision of a composition comprising, as the essential components or ingredients thereof, a particulate metal and a cutting fluid which is a vehicle therefor. The metal may be zinc, aluminum, titanium, magnesium, zirconium or lithium dust. However, zinc particles having a diameter (subsieve determination) between 0.5 and 50 microns and most desirably between 0.5 and 3 microns are preferred and the invention will be described in detail in connection with cutting compositions or compounds comprising the zinc dust.

The term "subsieve determination" is used and referred to in "New Methods for Particle Size Determination in the Subsieve Range," by Schweyer and Work, Am. Soc. for Testing Materials, pp. 1–22, 1941. The term is universally used in metallurgy and accepted as describing metal particle sizes below the limits of standard sieve ranges.

The fluid component of the new cutting compounds which, in the present compositions, also functions as a vehicle for the metal dust, may be water or an aqueous salt solution, e. g., an aqueous solution of soda ash or trisodium phosphate, provided that the composition also includes an agent which effectively inhibits corrosion of the zinc, especially if the composition is packaged. Preferably, however, the fluid is oil or one of the so-called "water-mixes" or "soluble oils," i. e., emulsions obtained by dispersing oils in water with the aid of an emulsifying agent. For example, the fluid may be mineral oil, mixtures of mineral and lard oils, paraffin oil, lard oil, sperm oil, liquid silicones i. e., silicone oils, mixtures of heavy sulphurized fatty oil and conventional grades of sulphurized mineral oil, etc. Or the fluid may be a mixture of water and oil. These oil-water mixes or "soluble oils" which are also known in the machining arts as "water-mix cutting fluids" represent a preferred embodiment of the invention. They have assumed major importance in the metal cutting art because, due to its high density, high specific heat, and low viscosity, the water serves as a potent heat-removing substance (i. e., the water is a positive coolant), while the oil provides the desired lubricity. The cutting fluid preferably comprises oil, straight or mixed with water, not only because it is desirable to take advantage of its lubricating properties but also because oil facilitates even distribution of the finely divided zinc on the surface of the work-piece as the latter is being cut and assists in maintaining the zinc dust in the dispersed condition for protecting the piece against corrosion after it has been cut, as is explained in greater detail hereinafter.

It is found that these compositions have unexpected outstanding advantages for use as cutting compounds in metal-cutting, where it is necessary to maintain a thin, strong lubricating film between relatively moving faces or parts of the metal object being worked on and the tool. When the compositions of this invention are applied to the area of contact, as by squirting through a nozzle attached to a reservoir associated with the machine in the usual way, the added zinc particles are subjected to both heat and pressure at the interface between the tool and the work. Under the influence of the intense heat created, the metal expands and, under the high pressure exerted at the interface, the minute particles of ductile zinc metal are squeezed into the pores of the heat-expanded metal surface and thus penetrate into and below the surface of the metal piece being worked. The natural electrical and physical affinities of zinc for steel or other metal are thus fully exerted, akin to galvanizing. It is significant that the area of maximum pressure coincides with that of maximum heat—at the working interface—constituting a powerful conjoint action to impress the zinc deeply into the pores of the metals while the latter are hot.

Accordingly, exceptional adhesion and uniform coverage of the zinc film are obtained on the work metal to afford unique resistance to corrosion or oxidation of the metal being cut.

Further, the cutting tool itself is afforded a measure of protection, though usually to a lesser degree in view of its greater hardness and surface density.

Moreover, the ductile film of zinc pressed into the surface of the metal serves to lubricate both active metal surfaces (tool and work) substantially to minimize friction that limits the speed of the machining operation. In other words, the tool is permitted to gouge out, crush, and sever chips or turnings from the work-piece with a minimum of heat-generating rubbing of hard tool metal directly on the work metal; there is invariably interposed a ductile film of zinc metal far more tenacious and durable than any oil or liquid emulsion alone. In other words, the energy of the tool is spent more effectively with zinc-containing preparations, on actual cutting or machining, rather than in purely frictional rubbing.

Accordingly, the use of these new cutting compounds comprising particulate metal and preferably zinc dust of the average particle size stated permits standard lubricating formulations to provide superior anti-friction surfaces for machining, to reduce the wear on tool, to speed up the operation, and to impart superior corrision resistance to the work-piece.

The use of the composition comprising the oil or water-oil emulsion and particulate zinc affords an additional measure of control of the temperature at the area of contact between the metal faces or parts. The incorporation of the particulate zinc in the composition materially increases the apparent density of the oil or oil-water emulsion. Because of its increased mass, each degree rise in temperature of the cutting compound requires a larger number of calories than if the zinc dust were omitted, with the practical result that the compound can absorb and carry away an increased amount of heat without itself becoming hot and, therefore, in effect, the cutting compound of the invention functions to cool the metal, permitting continuous, high-speed cutting without overheating or danger of metal-to-metal contact and welding. The inherent ductility of the zinc, and the oily, slippery, character of the finely divided particulate zinc are also assets, serving to enhance the natural lubricating properties of the oil or oil-water mixture.

The cutting compounds comprising the zinc particles have the additional advantage that they form a rustproof finish or coating on the machined part which is long-lasting because the zinc penetrates into the surface of the heat-expanded metal during the working. It has been observed that application of a cutting compound containing the sub-micron zinc dust as described herein to the area of contact between a cutting tool and a machine part comprising, for example, a mild steel, during cutting of the latter, resulted in a film or finish on the machined part which prevents rusting of the steel even when the part is exposed to the atmosphere in the shop for about three weeks. Penetration of the zinc particles into the the heat-expanded metal during the working, and the resulting strong electrolytic or attractive force between the zinc particles and the steel delays the onset of atmospheric changes because, while zinc is subject to ultimate deterioration when it is exposed to the atmosphere, it has a relatively high resistance to atmospheric attack and the deterioration proceeds very slowly, especially since the particles are imbedded in the metal piece. No special after-treatment of the machined part with a protective anti-corrosion agent is required because the zinc-containing finish in and on the part, after the machining operation, has to be destroyed before corrosion of the part proper ensues and the time required for its destruction under the conditions normally prevailing in the shop is so long that the part will generally be assembled before there is any sign of rusting of the steel or the like. Thus, by the practice of this invention, the metal part is simultaneously machined and provided with a long-lasting rustproof finish in a single operation. Furthermore, the oily film carried by the part after it is machined presents no problem with respect to its removal from the part when the latter is to be assembled since, to all practical purposes, it can be removed very readily by simply wiping it off with a cloth.

The proportion of zinc suspended in the cutting compound may be varied somewhat depending on the work to be done and the cutting compound used and may be between 5% and 150% by weight. Illustratively, cutting oils to be used during drilling operations preferably contain between 25% and 30% of the submicron zinc particles (weight percent of oil) whereas concentrations of the zinc dust around 150% are preferred when the composition is to be used during milling and the cutting compound is a water-soluble oil, i. e., water-oil mix.

The cutting compounds may be applied in various ways, as may be most convenient. The means for applying the cutting compound and the machine tool may be operated as a unit, the tool being designed with a built-in reservoir and circulating system, or the cutting compound may be pumped from a central station to the individual operating stations or to strategically located distributing centers.

One set-up which may be used is illustrated in the attached drawing, the single figure of which is a plan view of the apparatus. In the drawing, the reference numeral 1 represents a work-piece supported for rotation by means not shown, 2 is the cutting tool, 3 is a thermocouple which is held against the work surface to secure thermal expansion correction factor for the strain gauge, 4, and 5 is a spray gun through which the cutting compound is applied at the cutting edge.

The following examples illustrate specific embodiments of the invention:

EXAMPLE I (a) One hundred grams of #300 zinc powder (particles of 3 micron maximum size) were stirred vigorously into 245 grams of #120 Johnson wax cut, a standard, commercially available cutting fluid of the oil-based type.

(b) One hundred grams of the #300 zinc powder of (a) were mixed with 245 grams of the cutting compound "Sohio E," a commercially available emulsion of 5 parts of sulfonated petroleum oil and 95 parts of water.

Cutting compounds (a) and (b) were used for the cutting on a lathe of a mild steel rod (#1020 steel) at a speed of 210 ft. per minute with a cut of 0.050 on a side and a feed of 0.005 inch per minute, using a set-up as shown in the drawing.

For purposes of comparison, the Johnson #120 wax cut and sulfonated oil emulsion were used in similar runs, without the addition of zinc dust thereto.

The results were as shown in Table I, below.

*Table I*

| Cutting Compound | Strain Gauge Reading (corrected) |
|---|---|
| Sulfonated Oil Emulsion | 12,565 |
| Johnson #120 Wax Cut | 12,560 |
| Johnson #120 Wax Cut with Zinc | 12,530 |
| Sulfonated Oil Emulsion with Zinc | 12,530 |

It will be apparent from the table that the use of the cutting compounds containing the zinc dust resulted in substantial reduction of strain on the cutting tool.

The cut surfaces were exposed to a saline solution having the composition of normal perspiration (10% of NaCl by weight). After three days, the surfaces cut in the operations utilizing the plain sulfonated oil emulsion and the #120 wax cut samples showed substantial rusting, whereas the surfaces cut in the operations using the zinc-containing cutting compounds were entirely rust-free. After seven days, the surfaces cut using the zinc-free compounds were heavily rusted and those cut with the use of the zinc-containing compounds were not rusted at all.

EXAMPLE II

Mild steel rods (rod stock #1020) 1¼" in diameter and 1" long were drilled centrally with a standard ½" bit, HSS, in a series of tests in which the drilling was performed in the presence of a composition consisting of "S-1 Sohio," a commercially available straight cutting oil (which is a sulfonated petroleum oil containing active sulfur) containing zinc (#300 with particles under 3.0 microns (sub-sieve determination)), in amounts of 1, 2, 3 and 4 grams of the zinc dust per 100 grams of the oil. After the drilling, each specimen had the loose cuttings removed, and was allowed to drain for about 24 hours with the axis of the hole in vertical position. None of the specimens rusted during the 24-hour draining period. Each specimen was then placed in a glass container having a diameter of 2½" and containing 30 ml. of a 1% aqueous sodium chloride solution which covered the specimen to about one-half of its depth. The containers were covered loosely to permit access of air but to keep out dust that would otherwise settle therein. Each specimen was examined at regular intervals for corrosion of the machined surfaces and compared to a specimen which had been drilled in the same way but in the presence of the straight cutting oil only, i. e., S-1 Sohio oil which did not contain the zinc dust. The last-mentioned specimen was also exposed to perspiration and a 1% aqueous sodium chloride solution. The results of the tests are shown in the following table, in which the symbols "1Z," "2Z," "3Z," and "4Z" are used to designate, respectively, oil-zinc compositions containing 4.0, 10.0, 22.5 and 35.0 grams of zinc dust per 100 grams of oil.

It will be seen from the table that, while the specimen drilled in the presence of the cutting oil only was slightly rusted after only 2 days exposure to the salt solution and rusting proceeded so rapidly thereafter that the sample was discarded, the specimens drilled in the presence of the cutting oil-zinc dust mixture were not rusted even after 15 days exposure to perspiration or sodium chloride solution. The use of the zinc dust does not make any appreciable difference in the power requirements for drilling.

When the cutting fluid is a straight oil, the zinc particles will tend to remain suspended in the oil if the particles have a diameter (sub-sieve determination) at or near the lower limit of the range 0.5 to 50 microns. However, various expedients may be employed for maintaining the zinc in the suspended condition. The cutting compounds may take the form of an oil-in-oil emulsion having the zinc particles homogeneously suspended therein as by blending the particulate zinc and oils in a conventional type mixer in the presence of suitable emulsifiers, detergents or lubricity agents which facilitate the emulsification and may also serve to improve the lubricating properties of the oil, not only for the metal-working operation alone but also to promote slippage of the zinc particles over one another to improve the lubricating property of the ductile zinc itself, and/or may serve to improve the corrosion resistance by wetting the metallic surfaces to afford more direct and intensive action of anti-corrosive agents and by affording more rapid removal of the corrosive products of highly heated oil at the work surface.

Specific adjuvants which may be used in preparing the emulsions include synthetic methyl esters of mixed fatty acids, such as the methyl ester of mixed oleic and palmitic acids marketed under the designation "Base ML" by Carlisle Chemical Works; sulfurized alkyl phenol metallic organic compounds such as Monsanto Chemical's "Santolube" 303-A, which contains about 4% barium and about 0.9% sulfur; dibenzyl disulfide; tritolyl phosphate; Monsanto's "Santocel ARD"; fatty acid esters of polyhydric alcohols or ether alcohols, glycerol monostearate being illustrative; di- or tri-ethylene glycol or polyethylene glycol esters of fatty acids of the type of oleic acid; Turkey red oil; sperm oil; fatty esters of sugar alcohols such as the "Spans" (fatty acid partial esters of hexitol anhydrides) marketed by Atlas Powder Co.; higher fatty esters of pentaerythritol such as "Pentamul," a product marketed by Heyden Chemical Co.; the anti-corrosive and wetting agent marketed under the trade-name "Alox L-1727" by Alox Corporation; and the anti-corrosive agent marketed under the trade-name "X-Rust 477" by Freedom-Valvaline Oil Co.

Mixtures of liquids which may be used in preparing the emulsions include mixtures of the sulfonated or unsulfonated wetting oils with glycols, glycerols, or esters thereof, including the monolaurates and monoricinoleates of the polyethylene glycols of molecular weight 400 and 600. Glyceryl monoricinoleate is especially satisfactory since, due to its surface activity, it permits an especially uniform dispersion of the zinc particles in the oil. The emulsifying agents may be used in comparatively small

*Table II*
CORROSION OBSERVED

| No. of Days Exposed | 2 Salt Sol. | 4 Persp. | 6 Salt | 7 Persp. | 9 Salt | 11 Persp. | 13 Salt | 15 Persp. | 15 Salt |
|---|---|---|---|---|---|---|---|---|---|
| S-1 Plain | Slight Rust | Rusty | Rusty | Rusty rust | Bad Rust | Bad | (1) | (1) | (1) |
| 1Z | None | None | None | None | None | None | None | Slight Rust | None. |
| 2Z | do | do | do | do | do | do | do | None | Do. |
| 3Z | do | do | do | do | do | do | do | do | Do. |
| 4Z | do | do | do | do | do | do | do | do | Do. |

[1] Discontinued.

amounts sufficient to produce a satisfactory emulsion, and usually in amounts between 0.1% and 10% by weight.

Suspension or dispersion of the particulate zinc in the selected oil or oils may also be facilitated by placing a mixture of fluid and zinc dust in a field of sound waves having a frequency between about 1000 and 1,000,000 or more cycles per second, to effect dispersion of the zinc through the fluid under the influence of the sound wave radiations.

The suspended or dispersed condition of the zinc particles may also be maintained by incorporating with the composition up to about 10% of a suspending aid such as diatomaceous earth (Celite), or of hollow aerogel silica particles such as Monsanto Chemical Company's "Santocel," which suspending agents function to buoy up the zinc particles in the oil. The last-mentioned product is non-abrasive and highly effective as a suspending agent.

Suspension or dispersion of the zinc particles through the cutting oil or oil-water mixture may also be assisted by the addition of, say, 10 to 20% zinc oxide to the particulate metallic zinc, to obtain a fluid-metallic zinc-zinc oxide mixture having an apparent specific viscosity lower than the apparent specific viscosity of a fluid-metallic zinc mixture containing an amount of particulate zinc equivalent to the amount of zinc-zinc oxide in the fluid-metallic zinc-zinc oxide composition.

It is also within the purview of the invention to assist dispersion of the zinc particles through the cutting liquid by providing the particles with an oil-repellent coating of a silicone or similar synthetic resin. For example, the particles may be sprayed with the resin in the liquid condition, or deposited on a suitable conveyor and drawn through a bath of the liquid resin, and then dried. Furthermore, maintenance of the zinc particles in dispersed condition in the fluid may be assisted by mixing oil-repellent substances containing trapped air with the resin to provide, around the individual particles, a layer of air surrounded by a coating of the resin. Air may be whipped into the liquid resin by beating the latter in a vessel equipped with a rotary beater provided with blades, or in any other suitable manner.

Additionally, it is within the scope of the invention to mix up to about 10% of a thixotropic substance such as aluminum stearate (standard powdered commercial grade) with the oil-zinc or water-oil emulsion-zinc mixture, to gel the oil and support the individual metal particles in the gel until the composition is to be used, when, by subjecting the gel to agitation, as by simply pouring it from a container into a suitable reservoir associated with the cutting tool, or under the propelling action of the pump, the liquid condition of the oil is restored. Whether adjuvants for assisting suspension or dispersion of the zinc particles in the cutting compound are used or not, it is generally preferred to subject the mixture to vigorous, continuous stirring in the oil reservoir.

The following example illustrates the use of compositions comprising the cutting compound, zinc dust and various adjuvants which aid in maintaining the zinc dust in suspension in the cutting compound and may exert an anti-corrosive effect.

EXAMPLE III

Holes of ½" diameter were drilled in a ¼" angle iron in the presence of the compositions shown, the ½" drill bit being operated at 800 R. P. M. A drop of artificial perspiration was placed on each drilled surface to test for corrosion-resistance. The extent of corrosion (rusting) after 13 days is shown in Table II. In the table "S-1" is used to indicate the cutting oil S-1 Sohio, and "E" is used to indicate the soluble oil, Sohio E, which was applied to the work as a 1:20 aqueous emulsion.

*Table III*

| Cutting Compound | Additive | Drilling-Corrosion |
|---|---|---|
| E | 10% Zn | Very slight. |
| E | 150% Zn | None. |
| E | 2,000% Zn (Equiv. about 100% oil—H₂O Mix). | Do. |
| E | 10% Zn plus 8% Santocel | Do. |
| S-1 | 150% Zn | Do. |
| S-1 | 10% Zn plus 8% Santocel | Slight. |
| S-1 | 4% Santocel only | Considerable. |
| S-1 | 10% Zn, 10% Al Stearate, heat to 140° F | None. |
| E | 10% Zn, 10% Al stearate, heat to 140° F | Slight. |
| E | No Additive | Considerable. |

EXAMPLE IV

Cuts ¾" long, ¼" wide and 5.0 mils deep were made in a mild steel bar, using a horizontal milling machine, using as the cutting compound a 1:20 aqueous emulsion of Sohio E containing 2000% Zn (equivalent to about 100% of oil-water mix). Observations on corrosion-resistance were made after 9 days of exposure of the milled piece to a drop of artificial perspiration. Comparisons were made with samples milled in the same way but in the presence of other compositions and exposed to a drop of artificial perspiration for 9 days. The results are shown in the following table.

*Table IV*

| Composition | Additive | Corrosion |
|---|---|---|
| E | 2,000% Zn (equiv. to about 100% of oil-water mix). | None. |
| E | 10% Zn plus 10% Al Stearate, heat to 140° F. | Slight. |
| E | 10% Alox L-1727 plus 0.3 cc. Tergitol (sodium heptadecyl sulfate). | Bad. |
| E | 10% Alox L-1729 plus 0.3 cc. Tergitol plus 10% Santocel. | Do. |
| E | 10% Sperm oil 4SN plus 0.3 cc. Tergitol | Very bad. |
| E | X-Rust 477, 10% | Bad. |
| E | Santolube 70, 0.1% plus 1 cc. Tergitol | Do. |
| S-1 | 10% Sperm oil | Considerable. |
| S-1 | 10% Sperm oil plus 5% silica | Do. |
| S-1 | X-Rust 477, 10% | Do. |
| S-1 | Santolube 70, 0.1% | Do. |
| E | No Additive—control | Bad. |

In the tests shown herein, the compositions containing the zinc dust were found to be definitely superior to even the best of any other type of anti-corrosion (anti-rusting) agent.

Although the cutting compound may consist of the zinc particles, oil or water-oil mixture, and adjuvants such as emulsifying and dispersing aids, the composition may also comprise other adjuvants which either contribute special qualities to the cutting compound or enhance the inherent properties thereof. Thus, the cutting compound may comprise small amounts, for example amounts between 2% and 10% by weight, of rust-inhibiting substances. Among the anti-corrosive agents which may be included in the cutting compound there may be mentioned diphenylamine; higher fatty acid salts of dibenzylamine such as the oleate, palmitate or stearate; the phosphite ester of alkyd-phenols; dihexadecyl ketone, alkyl esters of malic acid containing more than six carbon atoms in the alkyl radical, such as the hexyl, cetyl, etc., esters; butylamine; and long chain aliphatic bifunctional diamines or diamides containing 6–20 carbon atoms and having terminal amino or amido groups which affix themselves to metal at the nitrogen atom and form a monomolecular protective film on the metal. As typical of these last-mentioned nitrogenous anti-corrosion materials may be mentioned the product known as "Rodine," which is marketed by American Chemical Paint Co. All the foregoing and other like materials, which may be used alone or, when chemically compatible, in admixture, supplement the high corrosion-resistance of the zinc.

Other adjuvants may be added to the cutting compounds for other special purposes. Thus, a small quantity, say, between 2% and 10% by weight, of a wax or a mixture of waxes for improving or supplementing the lubricity of the film formed between the cutting tool and the metal part being cut may be included in the composition. Suitable waxes which may be used include carnauba, candelilla, ouricuri, montan, oxidized petroleum waxes and mixtures with hydrocarbon waxes such as paraffin, and microcrystalline waxes. The microcrystalline waxes are particularly valuable for addition to the cutting compounds of the invention and are preferably used in their naturally oily condition, without a de-oiling pre-treatment. The cutting compound may, in certain instances, consist of water or an aqueous salt solution, containing a dispersed wax, such as a dispersed microcrystalline wax, and the metallic dust. Such compounds may also be further improved by the addition of strongly corrosion-resistant materials.

The cutting compounds of the invention have unique advantages. They possess the required lubricating capacity and, due to the high heat conductivity of the zinc, exhibit exceptionally high heat-absorbing capacity (cooling capacity) permitting high speeds of operation and feed rates which otherwise could not be realized because of overheating due to the friction developed by the high speeds. The present cutting compounds wet the metal or alloy being machined more effectively than the cutting compounds heretofore available and cling more tenaciously to the metal; i. e., the film of these compounds has increased strength and greater adherence to the metal.

The new cutting compounds have another outstanding advantage in that they serve to prolong the life of the cutting tool or the like. Hardened steels have a tendency to work-harden and in various operations, notably drilling or tapping operations, heavy pressures are required at the center of operation. This results in generally shortened tool life and, in some cases, necessitates scrapping of the tool because of local failure before the entire tool itself would normally have to be replaced. The same difficulty is encountered in other metal-working operations in which high pressures are required to separate the chip from the part being machined.

Use of the cutting compounds of the invention also eliminates the problem of rusting of the machined parts by perspiration deposited thereon in the course of handling the parts. Corrosion of the metal by perspiration may be attributed to the acids and salts present in the perspiration and, as is known, the composition varies from individual to individual. Cutting compounds which may afford some protection against rusting when the machined parts are handled by one person may be ineffective when the parts are handled by a different person. However, when the present cutting compounds are used, the resistance offered to penetration of the perspiration to the metal of the machined part by the zinc particles adhered to and intimately associated with the part is such that rusting by normal perspiration is eliminated entirely or retarded to such an extent that the rust does not eat through the zinc to the machined part proper in the time which expires, under normal shop conditions, between the machining operation and assembly of the parts.

The cutting compounds of this invention may be used in cutting or otherwise working various metals and is of particular utility in cutting objects comprising mild and stainless steels, alloys and cast iron.

The zinc dust-containing compounds or compositions described herein also have particular usefulness as cooling lubricants for combined crush and surface grinding operations. In that type of operation, the grinding tool is dressed periodically by crush-grinding to maintain its shape for subsequent, accurate surface-grinding of a large number of work-pieces. Heretofore, each of these operations, crush-grinding and surface-grinding, has required treatment with a different composition. Oil alone has been required for crush-grinding, because the pressures encountered are excessive for oil-water emulsions. However, oil alone has proved unsatisfactory for use in high-speed surface-grinding operations since it lacks the cooling capacity of compositions comprising water. Oil-water emulsions have been used for surface-grinding.

This use of two different treating agents entailed duplication of equipment for their application, or the trouble of changing and flushing the agents.

This problem is solved by the instant invention. The present cutting compounds comprising either oil or oil-water emulsions and metallic, more particularly zinc, dust are adapted to use in both crush-grinding and surface-grinding. The presence of the zinc dust in oil-type compounds adds heat-transfer capacity which keeps the work cool, in the manner of an oil-water emulsion, permitting use of the compound in both surface and crush-grinding. The presence of the zinc dust in oil-water emulsions not only increases the cooling and lubricating capacity of the oil-water emulsions but also provides the body and resistance to pressure, normally lacking in oil-water emulsions, which adapts the compounds to use in crush-grinding. Furthermore, the film of zinc metal impressed into the heat-expanded surfaces of the work-piece imparts thereto the invaluable property of corrosion-resistance. Thus, the present oil- or oil-water-based compositions of compounds containing zinc dust can be used for the dual purposes of crush-grinding and surface-grinding.

It will be understood that the term "cutting compound" as used herein is intended to define compounds for use in cutting, grinding, tapping and other similar metal-working operations, and that the terms "metal dust" or "zinc dust" refer to the metal or zinc particles having a size of between 0.5 and 50 microns, specifically 0.5 to 10.0 and in the preferred embodiment between 0.5 and 3.0 microns.

The invention has been discussed in detail in connection with cutting compounds and the working of metal in the presence of the compositions containing the particles of zinc or other metals specified herein. It will be obvious that, in its broader aspects, the invention involves a method of impregnating metal, particularly heat-expanded metal, with the zinc or other metal particles by treating the metal with compositions comprising the particles and particularly by pressing compositions comprising the particles into the metal base, most desirably while the metal base is in heat-expanded condition, whether the heating and pressing are developed as a result of a working, e. g., cutting, operation or not.

It will be understood that variations and modifications may be made in the compositions described herein without departing from the invention or the spirit and scope of the appended claims.

What is claimed is:

1. The method of simultaneously working metal and impregnating it with fine particles of a rustproofing metal which comprises interposing between a working tool and the metal to be worked a dispersion or from 5% to 150% by weight of particles of a rustproofing metal having a diameter (sub-sieve determination) between 0.5 micron and 50 microns in an oil-based cutting fluid, and working the metal with said tool so that, during the working operation, and under the influence of the pressure of the working, the fine particles of the rustproofing metal are forced into the pores opened in the metal being worked by the frictional heat generated by the working.

2. The method according to claim 1, characterized in that the particles dispersed in the oil-based cutting fluid are zinc particles having a diameter (sub-sieve determination) between 0.5 and 10 microns.

3. The method according to claim 1, characterized in that the particles dispersed in the oil-based cutting fluid are zirconium particles having a diameter (sub-sieve determination) between 0.5 and 10 microns.

4. The method according to claim 1, characterized in that the particles dispersed in the oil-based cutting fluid are lithium particles having a diameter (sub-sieve determination) between 0.5 and 10 microns.

5. The method according to claim 1, characterized in that the particles dispersed in the oil-based cutting fluid are magnesium particles having a diameter (sub-sieve determination) between 0.5 and 10 microns.

6. The method according to claim 1, characterized in that the particles dispersed in the oil-based cutting fluid are titanium particles having a diameter (sub-sieve determination) between 0.5 and 10 microns.

7. The method according to claim 1, characterized in that the oil-based cutting compound is an emulsion of 5 parts of sulfonated petroleum oil and 95 parts of water.

8. The method according to claim 1, characterized in that the oil-based cutting fluid is an emulsion of 5 parts of sulfonated petroleum oil and 95 parts of water, and the metal particles dispersed therein are zinc particles having a diameter (sub-sieve determination) between 0.5 micron and 10 microns.

9. The method according to claim 1, characterized in that the oil-based cutting fluid is an emulsion of 5 parts of sulfonated petroleum oil and 95 parts of water, and the metal particles dispersed therein are zirconium particles having a diameter (sub-sieve determination) between 0.5 micron and 10 microns.

10. The method according to claim 1, characterized in that the oil-based cutting fluid is an emulsion of 5 parts of sulfonated petroleum oil and 95 parts of water, and the metal particles dispersed therein are titanium particles having a diameter (sub-sieve determination) between 0.5 micron and 10 microns.

11. The method according to claim 1, characterized in that the oil-based cutting fluid is an emulsion of 5 parts of sulfonated petroleum oil and 95 parts of water, and the metal particles dispersed therein are lithium particles having a diameter (sub-sieve determination) between 0.5 micron and 10 microns.

12. The method according to claim 1, characterized in that the oil-based cutting fluid is an emulsion of 5 parts of sulfonated petroleum oil and 95 parts of water, and the metal particles dispersed therein are magnesium particles having a diameter (sub-sieve determination) between 0.5 micron and 10 microns.

References Cited in the file of this patent

UNITED STATES PATENTS

| | | |
|---|---|---|
| 1,758,598 | Frizell | May 13, 1930 |
| 1,762,547 | Churchill | June 10, 1930 |
| 1,810,905 | Carter | June 23, 1931 |
| 1,839,159 | Newbern | Dec. 29, 1931 |
| 1,884,749 | Kocour | Oct. 25, 1932 |
| 1,913,953 | Prendergast et al. | June 13, 1933 |
| 2,099,241 | Stewart | Nov. 16, 1937 |
| 2,173,100 | Drapeau et al. | Sept. 19, 1939 |
| 2,205,990 | Nelson et al. | June 25, 1940 |
| 2,393,927 | Myers | Jan. 29, 1946 |
| 2,466,647 | Stern | Apr. 5, 1949 |
| 2,563,588 | Dixon | Aug. 7, 1951 |
| 2,640,001 | Clayton | May 26, 1953 |
| 2,695,877 | Nichols et al. | Nov. 30, 1954 |

FOREIGN PATENTS

| | | |
|---|---|---|
| 22,264 | Australia | Sept. 6, 1929 |
| 23,301 | Australia | June 29, 1935 |
| 35,572 | Norway | Aug. 21, 1922 |
| 158,922 | Great Britain | Feb. 24, 1921 |